(12) United States Patent
Bender

(10) Patent No.: US 9,487,065 B2
(45) Date of Patent: Nov. 8, 2016

(54) FLUSH SLIDING WINDOW ASSEMBLY

(71) Applicant: Taylor Made Group, LLC, Gloversville, NY (US)

(72) Inventor: Thomas J. Bender, Fort Wayne, IN (US)

(73) Assignee: TAYLOR MADE GROUP, LLC, Gloversville, NY (US)

( * ) Notice: Subject to any disclaimer, the term of this patent is extended or adjusted under 35 U.S.C. 154(b) by 19 days.

(21) Appl. No.: 14/250,018

(22) Filed: Apr. 10, 2014

(65) Prior Publication Data
US 2015/0292256 A1   Oct. 15, 2015

(51) Int. Cl.
*B60J 1/18* (2006.01)
*E06B 3/46* (2006.01)
*B60J 1/16* (2006.01)
*E05F 11/52* (2006.01)

(52) U.S. Cl.
CPC ............ *B60J 1/1853* (2013.01); *B60J 1/16* (2013.01); *E06B 3/4627* (2013.01); *E05F 11/525* (2013.01)

(58) Field of Classification Search
CPC ........ B60J 1/18; B60J 1/1846; B60J 1/1853; B60J 1/1892
USPC .......... 49/209, 210, 211, 216, 221, 225, 260
See application file for complete search history.

(56) References Cited

U.S. PATENT DOCUMENTS

| | | | | |
|---|---|---|---|---|
| 393,155 A * | 11/1888 | Hickey | ............... | E05D 15/1047 49/213 |
| 931,052 A * | 8/1909 | Fristad | ............... | E05D 15/1047 49/213 |
| 1,060,181 A * | 4/1913 | Griffith | ............... | E05D 15/1047 49/213 |
| 1,077,798 A * | 11/1913 | Burgoon | ............. | E05D 15/1047 49/213 |
| 1,476,168 A * | 12/1923 | Montgomery | ....... | B61D 19/005 16/96 R |
| 1,908,698 A * | 5/1933 | Edwards | ............. | B61D 19/002 49/216 |
| 2,036,991 A * | 4/1936 | Tobin | ................... | B61D 19/005 49/213 |
| 2,863,182 A * | 12/1958 | Gabor | ....................... | E06B 7/06 292/185 |
| 3,660,936 A * | 5/1972 | Bryson | ................. | E06B 3/4627 49/209 |
| 4,071,978 A | 2/1978 | Rampel et al. | | |
| 4,337,596 A * | 7/1982 | Kern | ................... | E05D 15/1081 396/517 |
| 4,384,429 A * | 5/1983 | Rokicki | ............. | E05D 15/1013 49/130 |
| 4,483,100 A | 11/1984 | Blankenburg et al. | | |
| 4,551,945 A * | 11/1985 | von Resch | .......... | E05D 15/1013 49/130 |
| 4,561,224 A | 12/1985 | Jelens | | |
| 4,794,730 A * | 1/1989 | Fischbach | ........... | E05D 15/1013 49/130 |

(Continued)

*Primary Examiner* — Brian Mattei
*Assistant Examiner* — Catherine A Kelly
(74) *Attorney, Agent, or Firm* — Nixon & Vanderhye P.C.

(57) ABSTRACT

A sliding window assembly includes a window frame supporting a main glass with an opening, and a carriage coupled in the window frame and supporting a slider glass sized to fit into the opening in the main glass. The carriage is displaceable in the window frame between an open position, a ready position, and a closed position. The slider glass is disposed in the opening when the carriage is in the closed position. A lever assembly connects the carriage and the window frame. The carriage is linearly displaceable in a first direction between the open position and the ready position, and the carriage is linearly displaceable in a second direction perpendicular to the first direction between the ready position and the closed position.

7 Claims, 1 Drawing Sheet

(56) References Cited

U.S. PATENT DOCUMENTS

| | | | | |
|---|---|---|---|---|
| 4,850,139 A | * | 7/1989 | Tiesler | B60J 10/06 296/155 |
| 4,903,436 A | | 2/1990 | Rouillard | |
| 5,189,837 A | * | 3/1993 | Ienaga | E05D 15/10 49/127 |
| 5,505,023 A | * | 4/1996 | Gillen | B60J 10/04 49/209 |
| 5,542,214 A | * | 8/1996 | Buening | B60J 1/16 49/127 |
| 5,613,323 A | * | 3/1997 | Buening | B60J 1/16 49/130 |
| 5,799,444 A | | 9/1998 | Freimark et al. | |
| 5,996,284 A | | 12/1999 | Freimark et al. | |
| 6,385,910 B1 | * | 5/2002 | Smink | B60J 5/062 49/120 |
| 7,219,470 B2 | | 5/2007 | Lahnala | |
| 7,395,631 B2 | | 7/2008 | Lahnala | |
| 7,464,501 B2 | * | 12/2008 | Arimoto | E05F 15/646 49/209 |
| 7,509,773 B2 | | 3/2009 | Vornbaumen et al. | |
| 7,568,312 B2 | | 8/2009 | Dufour et al. | |
| 7,584,574 B2 | * | 9/2009 | Kinross | B60J 1/1853 49/209 |
| 7,934,342 B2 | | 5/2011 | Lahnala | |
| 8,048,529 B2 | | 11/2011 | Lewno | |
| 8,127,498 B2 | | 3/2012 | Lahnala | |
| 8,272,168 B2 | | 9/2012 | Lahnala | |
| 8,316,583 B2 | | 11/2012 | Lahnala | |
| 8,322,073 B2 | | 12/2012 | Lewno | |
| 8,322,075 B2 | | 12/2012 | Lahnala | |
| 8,388,043 B2 | | 3/2013 | Lahnala | |
| 8,484,898 B2 | * | 7/2013 | Ohishi | E05D 3/022 49/213 |
| 8,595,981 B2 | | 12/2013 | Lahnala | |
| 8,668,989 B2 | | 3/2014 | Lewno | |
| 9,027,282 B2 | * | 5/2015 | Schreiner | E05D 15/0608 49/210 |
| 9,109,384 B2 | * | 8/2015 | Minter | E05C 19/10 |
| 2001/0032417 A1 | * | 10/2001 | Degelman | E05D 15/1002 49/214 |
| 2002/0148163 A1 | * | 10/2002 | Warner | B60J 10/08 49/209 |
| 2003/0221382 A1 | * | 12/2003 | Liu | E05D 15/0686 52/204.5 |
| 2006/0022492 A1 | * | 2/2006 | Fallis, III | B60J 1/1823 296/216.01 |
| 2015/0089875 A1 | * | 4/2015 | Malmrose | E06B 3/4627 49/130 |

* cited by examiner

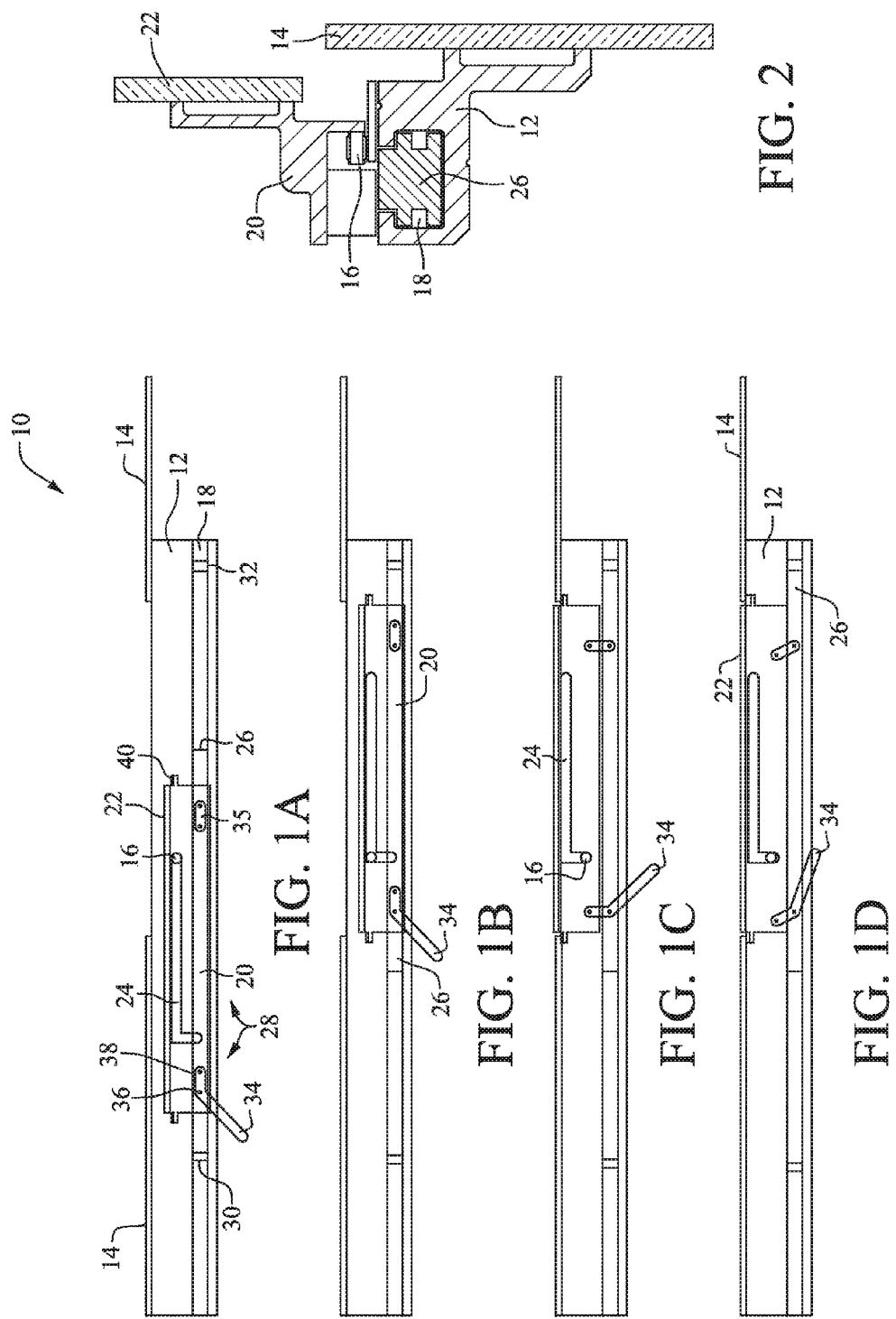

FLUSH SLIDING WINDOW ASSEMBLY

CROSS-REFERENCES TO RELATED APPLICATIONS (Not applicable)

STATEMENT REGARDING FEDERALLY SPONSORED RESEARCH OR DEVELOPMENT (Not applicable)

BACKGROUND OF THE INVENTION

The invention relates to a sliding window assembly and, more particularly, to a sliding window assembly with a linearly displaceable carriage and structure to facilitate opening and closing.

Sliding window assemblies are used in land and marine environments to provide for easily opening and closing a section of a window. Sliding windows are used for rear cab windows, bus driver windows, etc. In a flush slider assembly, with the window in a closed position, the window panes are substantially flush defining a planar surface. The planar/flush closed window provides a much cleaner and desirable appearance.

In a typical flush slider assembly, the window panel is usually cooperable with a jogged track or pathway to be displaced across and forward into the flush configuration. The configurations using a jogged track, however, are typically expensive to manufacture and are susceptible to design defects that make it more difficult to close the window.

BRIEF SUMMARY OF THE INVENTION

The sliding window assembly of the described embodiment can be used in a multitude of land and marine environments. When closed, the sliding portion of the glass is preferably flush with the main portion of the glass, giving the entire system a much cleaner appearance. Due to the way in which the slider glass articulates, a very tight seal is made between the main portion of the glass and the slide portion of the glass. As a result, there is a reduction in noise external to the vehicle, and water infiltration is essentially eliminated.

In an exemplary embodiment, a sliding window assembly includes a window frame supporting a main glass with an opening, and a carriage coupled in the window frame and supporting a slider glass sized to fit into the opening in the main glass. The window frame includes a timer bearing and a main track. The carriage is displaceable between an open position, a ready position, and a closed position and includes a bearing track in which the timer bearing is engaged. A glider is positioned in the main track, and a lever assembly connects the carriage with the glider. The bearing track is shaped such that the carriage is linearly displaceable on the timer bearing in a first direction between the open position and the ready position, and the carriage is linearly displaceable on the timer bearing in a second direction perpendicular to the first direction between the ready position and the closed position.

The lever assembly may include a pivotable lever that is connected at a first connection point to the glider and at a second connection point to the carriage, where the first connection point constitutes a pivot axis for the pivotable lever, and where the second connection point is spaced from the first connection point. In this context, the pivotable lever may be displaceable between an active position and a locked position. The pivotable lever may be configured such that from the active position to the locked position, the second connection point is pivoted around and over the first connection point, and the pivotable lever assumes an over center position.

The assembly may further include a seal disposed surrounding the slider glass that engages the main glass when the carriage is displaced to the closed position. An open stop may be fixed in the main track that delimits the open position of the carriage. The bearing track may be substantially L-shaped, with a long leg of the L-shape being oriented in the first direction, and with a short leg of the L-shape being oriented in the second direction. In the closed position, the slider glass disposed in the opening in the main glass may be substantially flush with the main glass. The lever assembly may also include a secondary lever that is linked with the pivotable lever.

In another exemplary embodiment, a sliding window assembly includes a window frame supporting a main glass with an opening, and a carriage coupled in the window frame and supporting a slider glass sized to fit into the opening in the main glass. The carriage is displaceable in the window frame between an open position, a ready position, and a closed position. The slider glass is disposed in the opening when the carriage is in the closed position. A lever assembly connects the carriage and the window frame. The carriage is linearly displaceable in a first direction between the open position and the ready position, and the carriage is linearly displaceable in a second direction perpendicular to the first direction between the ready position and the closed position.

The lever assembly may be configured for one-direction operation between the open position, the ready position, and the closed position such that a force applied to the lever assembly in only the first direction effects displacement of the carriage from the open position to the closed position.

In yet another exemplary embodiment, a method of operating a sliding window assembly includes closing the sliding window assembly by (a) displacing the carriage with the lever assembly in a first linear direction from an open position to a ready position; (b) after step (a), displacing the carriage with the lever assembly in a second linear direction perpendicular to the first linear direction from the ready position to a closed position; and (c) after step (b), locking the carriage in the closed position with the lever assembly. Steps (a), (b) and (c) may be practiced by applying a force to the lever assembly in only the first linear direction. The method may additionally include opening the sliding window assembly by (d) unlocking the carriage with the lever assembly; (e) after step (d), displacing the carriage with the lever assembly in a direction opposite to the second linear direction from the closed position to the ready position; and (f) after step (e), displacing the carriage with the lever assembly in a direction opposite to the first linear direction from the ready position to the open position. Steps (d), (e) and (f) may be practiced by applying a force to the lever assembly in only the direction opposite to the first linear direction.

BRIEF DESCRIPTION OF THE DRAWINGS

These and other aspects and advantages will be described in detail with reference to the accompanying drawings, in which:

FIG. 1A-1D illustrate a sequence of images showing the sliding window assembly being moved from an open position to a closed position; and FIG. 2 is a side view of the sliding window assembly.

DETAILED DESCRIPTION OF THE INVENTION

The sliding window assembly according to preferred embodiments will be described with reference to FIGS. 1A-1D and 2. In FIGS. 1A-1D, only the bottom sliding assembly 10 is shown, situated at the bottom of a slider window assembly. In one construction, a mirror image of the slider components is located at the top of the slider assembly, with a linkage between upper and lower assemblies. The linkage serves to maintain the upper components in sync with the lower components. In a preferred construction, the lower components are the ones actuated manually, and the upper components are slaved to the lower components via the linkage.

The sliding window assembly 10 includes a window frame 12 supporting a main glass 14 with an opening. The window frame 12 includes a timer bearing 16 and a main track 18.

A carriage 20 is coupled in the window frame and supports a slider glass 22 that is sized to fit in the opening in the main glass 14. The window frame 12 and the main glass 14 are bonded together, and the window frame 12 provides a track for the carriage 20 and slider glass 22. In one embodiment, the slider glass 22 is bonded to the carriage 20. The carriage is displaceable between an open position (FIG. 1A), a ready position (FIGS. 1B and 1C) and a closed position (FIG. 1D). The carriage 20 includes a bearing track 24 in which the timer bearing 16 is engaged.

A glider 26 is positioned in the main track 18, and a lever assembly 28 connects the carriage 20 with the glider 26. The glider 26 is displaced with the carriage 20. The glider 26 may be formed of aluminum or plastic and is captured in the main track 18. A lubricant such as grease or the like may be provided to assist the glider 26 in sliding movement in the main track 18. An open stop 30 and a close stop 32 are secured in the main track 18. The glider 26 engages the open stop 30 and the close stop 32 when the carriage is displaced between the open and ready positions, respectively. The open stop 30 delimits the open position of the carriage 20.

The lever assembly 28 includes a pivotable lever 34 that is connected at a first connection point 36 to the glider 26 and at a second connection point 38 to the carriage 20. The first connection point 36 constitutes a pivot axis for the pivotable lever 34. As shown, the second connection point 38 is spaced from the first connection point 36. The lever assembly 28 also includes a secondary lever 35 that is linked with the pivotable lever 34.

With reference to the image sequence in FIGS. 1A-1D, the pivotable lever 34 is displaceable between an active position (FIGS. 1A and 1B) and a locked position (FIG. 1D). As shown, the pivotable lever 34 is configured such that from the active position to the locked position, the second connection point 38 is pivoted around and over the first connection point 36, and the pivotable lever 34 assumes an over-center position.

A seal 40 such as an adhesive seal or the like is disposed surrounding the slider glass 22. The seal 40 engages the main glass 14 when the carriage 20 is displaced to the closed position. The seal 40 may alternatively be in the form of a rubber gasket or other suitable material, with or without an adhesive backing. It is desirable that the seal 40 is sufficiently robust and resilient that when compressed, the material will generally push back against an underside of the main glass 14.

As shown, in the closed position (FIG. 1D), the slider glass 22 disposed in the opening in the main glass 14 is substantially flush with the main glass 14.

An operation for closing the window assembly 10 will be described with reference to the image sequence in FIGS. 1A-1D. To aid in understanding the operation of the sliding window assembly 10, it should be helpful to note that the following parts are tied together and move as a unit: the slider glass 22 bonded to the carriage 20, the glider 26 riding in the main track 18, the seal 40, the pivotable 34 and secondary 35 levers, and the bearing track 24.

In FIG. 1A, the window assembly is shown in the open position. To close the window assembly 10, a force is applied to the pivotable lever 34 (to the right in FIGS. 1A-1D). In some embodiments, enough force must be applied to overcome a small spring-loaded detent located in the glider 26, which aids in holding the carriage 20 in the open position. The carriage 20 moves linearly in the direction of the force by the engagement of the timer bearing 16 in the bearing track 24. That is, the force on the pivotable lever 34 will tend to urge the carriage 20 to pitch (counter-clockwise in FIGS. 1A-1D). The timer bearing 16 in the bearing track 24 prevents any rotation of the carriage 20.

As shown, the bearing track 24 is substantially L-shaped, where a long leg of the L-shape is oriented in a first direction for linear movement of the carriage 20 between the open position (FIG. 1A) to the ready position (FIG. 1B). The short leg of the L-shape is oriented in a second direction, which is perpendicular to the long leg of the L-shape (i.e., perpendicular to the first direction).

The carriage 20 is stopped by engagement of the glider 26 with the close stop 32. The timer bearing 16 is also positioned at an end of the bearing slot 24 (left side in the image), and the carriage 20 is prevented from further displacement in the first direction. A continued force on the pivotable lever 34 causes the pivotable lever 34 to rotate (counter-clockwise in FIGS. 1A-1D) around the first connection point 36. As the pivotable lever 34 continues to pivot, the second connection point 38 is pivoted around and over the first connection point 36 (see FIG. 1C), and the carriage 20 is displaced linearly in a second direction, perpendicular to the first direction by the timer bearing 16 in the short leg of the L-shape of the bearing track 24. That is, the slider glass 22 is displaced toward the opening in the main glass 14. A continued force on the pivotable lever 34 results in the seal 40 between the slider glass 22 and the main glass 14 being compressed. In some embodiments, the slider glass 22 momentarily protrudes beyond the main glass 14 when compressing the seal 40.

In FIG. 1D, the pivotable lever 34 is further displaced such that the second connection point 38 is pivoted passed the first connection point 36 (to the left of the first connection point 36 FIG. 1D), and the pivotable lever 34 assumes an over-center position. As shown in the drawings, the secondary lever 35 is displaced in concert with the first 36 and second 38 connection points of the pivotable lever 34. In this position, the carriage 20 and slider glass 22 are locked in the closed position, with the slider glass 22 flush or co-planar with the main glass 14. The close stop 32 is positioned so that the slider glass 22 motion, when the slider glass 22 is co-planar with the main glass 14 after the lever assumes the over-center position, stops when the glider 26 bottoms out against the close stop 32. Otherwise, the slider glass 22 could sit slightly above or below the plane of the main glass 14, which defeats the flush window concept. With the pivotable lever 34 in an over-center position, a force applied to the outside of the slider glass 22, such as during an attempt to open the slider glass 22 without permission, results in the slider glass 22 closing more tightly.

In order to open the sliding window assembly, the described steps are reversed by applying a force to the pivotable lever 34 in the opposite direction (to the left in FIGS. 1A-1D). The carriage 20 is slid until the glider 26 makes contact with the open stop 30. As noted, in some embodiments, a spring-loaded detent engages the main track 18 to aid in holding the carriage 20 in the open position.

The lever assembly 28 is thus configured for one-direction operation between the open position, the ready position, and the closed position such that a force applied to the lever assembly 28 in only the first direction effects displacement of the carriage 20 from the open position to the closed position. In a similar context, by applying a force to the lever assembly 28 in only the direction opposite to the first linear direction, the carriage 20 can be unlocked, displaced to the ready position, and displaced to the open position.

As noted, in the closed position, the sliding portion of the glass may be flush with the main portion of the glass, giving the entire assembly a much cleaner appearance. Additionally, due to the manner in which the slider glass articulates, a very tight seal can be made between the main portion of the glass and the slide portion of the glass. As a result, there is a reduction in noise external to the vehicle, and water infiltration is essentially eliminated. The closing mechanism geometry provides for a simple, effective and dependable locking mechanism.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A sliding window assembly comprising:
a window frame supporting a main glass with an opening, the window frame including a timer bearing and a main track;
a carriage coupled in the window frame and supporting a slider glass sized to fit into the opening in the main glass, wherein the carriage is displaceable between an open position, a ready position, and a closed position, the carriage including a bearing track in which the timer bearing is engaged;
a glider positioned in and moving linearly along the main track, the glider having a length at least as long as a length of the carriage, wherein the glider is provided with at least one stop at an end of the glider; and
a lever assembly connecting the carriage with the glider, wherein the bearing track is shaped such that the carriage is linearly displaceable on the tinier bearing in a first direction between the open position and the ready position, and such that the carriage is linearly displaceable on the timer bearing in a second direction perpendicular to the first direction between the ready position and the closed position, wherein the lever assembly comprises a pivotable lever that is connected at a first connection point directly to the glider and at a second connection point directly to the carriage, wherein the first connection point constitutes a pivot axis for the pivotable lever, wherein the second connection point is spaced from the first connection point by a distance substantially corresponding to a distance displaced by the carriage between the ready position and the closed position, wherein the pivotable lever is displaceable between an active position and a locked position, and wherein the pivotable lever is configured such that from the active position to the locked position, the second connection point is pivoted around and over the first connection point, and the pivotable lever assumes an over center position.

2. A sliding window assembly according to claim 1, further comprising a seal disposed surrounding the slider glass, wherein the seal engages the main glass when the carriage is displaced to the closed position.

3. A sliding window assembly according to claim 1, further comprising an open stop fixed in the main track, the open stop delimiting the open position of the carriage.

4. A sliding window assembly according to claim 1, wherein the bearing track is substantially L-shaped, a long leg of the L-shape being oriented in the first direction, and a short leg of the L-shape being oriented in the second direction.

5. A sliding window assembly according to claim 1, wherein in the closed position, the slider glass disposed in the opening in the main glass is substantially flush with the main glass.

6. A sliding window assembly according to claim 1, wherein the lever assembly further comprises a secondary lever that is linked with the pivotable lever, the secondary lever being positioned on an opposite side of the carriage from the pivotable lever.

7. A sliding window assembly comprising:
a window frame supporting a main glass with an opening;
a carriage coupled in the window frame and supporting a slider glass sized to fit into the opening in the main glass, wherein the carriage is displaceable in the window frame between an open position, a ready position, and a closed position, the slider glass being disposed in the opening when the carriage is in the closed position; and
a lever assembly connecting the carriage and the window frame,
wherein the carriage is linearly displaceable in a first direction between the open position and the ready position, and wherein the carriage is linearly displaceable in a second direction perpendicular to the first direction between the ready position and the closed position,
wherein the window frame comprises a timer bearing and a main track, the sliding window assembly further comprising a glider positioned in and moving linearly along the main track, the glider having a length at least as long as a length of the carriage, wherein the glider is provided with at least one stop at an end of the glider, wherein the carriage includes a bearing track in which the timer bearing is engaged, and wherein the bearing track is shaped to effect the linear displacement of the carriage in the first and second directions,
wherein the lever assembly comprises a pivotable lever that is connected at a first connection point directly to the glider and at a second connection point directly to the carriage, wherein the first connection point constitutes a pivot axis for the pivotable lever, wherein the second connection point is spaced from the first connection point, wherein the pivotable lever is displaceable between an active position and a locked position, and wherein the pivotable lever is configured such that from the active position to the locked position, the second connection point is pivoted around and over the first connection point, and the pivotable lever assumes an over center position, and wherein the lever assembly is configured for one-direction operation between the open position, the ready position, and the closed position such that a force applied to the lever assembly in only the first direction effects displacement of the carriage from the open position to the closed position, wherein the first connection point is disposed on one side of the second connection point relative to the first direction with the pivotable lever in the active position, and wherein the first connection point is disposed on an opposite side of the second connection point relative to the first direction with the pivotable lever in the locked position.

* * * * *